Dec. 22, 1931.   E. H. LAABS   1,837,224
MOTOR CONTROLLER
Filed Feb. 8, 1930   2 Sheets-Sheet 2
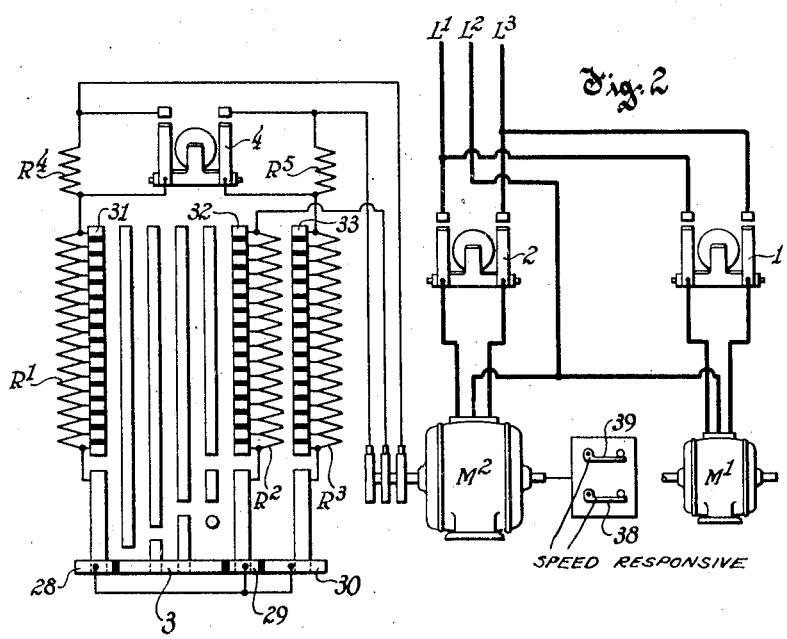
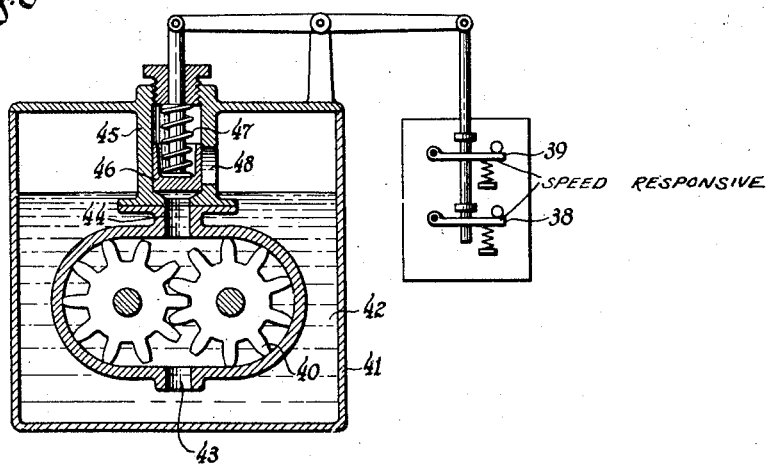
Inventor
Eric H. Laabs
By Frank Hubbard
Attorney Patented Dec. 22, 1931

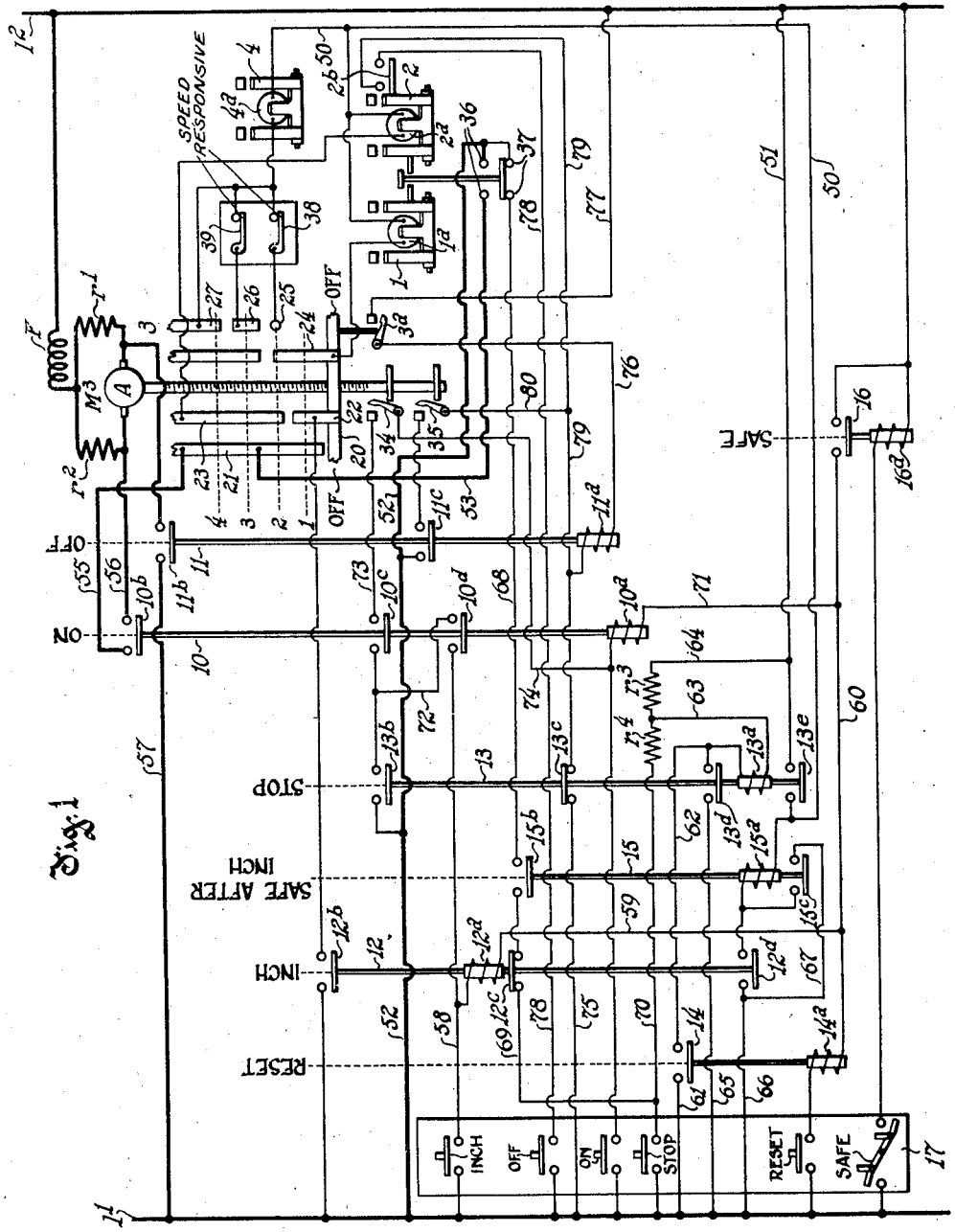

1,837,224

UNITED STATES PATENT OFFICE

ERIC H. LAABS, OF MILWAUKEE, WISCONSIN, ASSIGNOR TO CUTLER-HAMMER, INC., OF MILWAUKEE, WISCONSIN, A CORPORATION OF DELAWARE

MOTOR CONTROLLER

Application filed February 8, 1930. Serial No. 426,894.

This invention relates to motor controllers and while not limited thereto is particularly applicable to controllers for printing presses.

Large newspaper presses are commonly provided with a small and a large driving motor. The small motor provides for operation of the press at a relatively low threading speed while the large motor provides for operation thereof at higher speeds, the small motor being then automatically disconnected from its supply circuit and disengaged from the drive. In such installations it is necessary to operate the press by means of the large motor at relatively low take-off speeds so as to provide for equalization of the pull on the web during acceleration and to also enable the operator to make the necessary margin adjustments. However, it has heretofore been difficult to control the large motor so as to provide the required low take-off speeds and at the same time maintain the torque required for starting, this being especially true in high speed printing presses employing A. C. motors.

The present invention has among its objects to provide an improved controller which is particularly adapted for use in connection with high speed A. C. printing presses and which provides for operation of the large motor at one or more relatively low take-off speeds and also insures a relatively high starting torque.

Various other objects and advantages of the invention will hereinafter appear.

The accompanying drawings illustrate an embodiment of the invention which will now be described, it being understood that the embodiment illustrated is susceptible of modification without departing from the spirt and scope of the appended claims.

In the drawings

Figure 1 diagrammatically illustrates a controller embodying the invention.

Fig. 2 diagrammatically illustrates the large and small driving motors and the circuit connections therefor, and Fig. 3 schematically illustrates a control device employed in the system shown in Fig. 1.

The controller illustrated in Fig. 1 provides for control of a printing press drive including a small motor $M^1$ and a large motor $M^2$, said motors being shown in Fig. 2. Motors $M^1$ and $M^2$ are of a three phase alternating current type and electroresponsive switches 1 and 2 are provided for selectively connecting the same to a supply circuit indicated by lines $L^1$—$L^2$—$L^3$. The speed of the large motor $M^2$ is controlled by means of resistances $R^1$ to $R^5$, inclusive, which are connected in the secondary circuit thereof. As hereinafter set forth resistances $R^1$, $R^2$ and $R^3$ are controlled by a rheostat 3 while resistances $R^4$ and $R^5$ are controlled by an electroresponsive switch 4.

As shown in Fig. 1 the control means for switches 1, 2 and 4 and rheostat 3 includes an "on" relay 10, an "off" relay 11, an "inch" relay 12, a "stop" relay 13, a "reset" relay 14, a "safe after inch" relay 15 and a "safe" relay 16. Each of said relays is provided with an operating winding designated by reference character "a" and each, with the exception of the "safe after inch" relay, has a control switch located at a push button station 17. The control switch for the "safe" relay 16 is of a two button snap operating type while the other control switches are of the normally open push button type.

Rheostat 3 is of the crosshead type and as shown in Fig. 1 the same is provided with a driving motor $M^3$ having an armature A and a series field winding F. The crosshead of rheostat 3 is provided with a bridging contact 20 which cooperates with a plurality of auxiliary contacts 21 to 27, inclusive. Also, as shown in Fig. 2, said crosshead is provided with insulated main contacts 28, 29 and 30 which are electrically connected to each other and cooperate with three sets of stationary contacts 31, 32 and 33, associated with resistances $R^1$, $R^2$, and $R^3$. As hereinafter set forth the rheostat motor $M^3$ has means associated therewith for effecting step by step operation thereof. Such means includes normally op-en limit switches 34 and 35 which are associated with the operating mechanism of the rheostat and are adapted to close immediately upon starting of the motor $M^3$ and to reopen upon a given degree of operation of such motor. Rheostat 3 also has a limit switch 3ª associated therewith which is adapted to open in the off position of the crosshead.

In addition to the aforedescribed control means the controller includes normally open auxiliary contacts 36 and normally closed auxiliary contacts 37 associated with switches 1 and 2 and normally closed switches 38 and 39 which are adapted to control switch 4 and are associated with a speed responsive device which may be of the character shown in Fig. 3.

The device shown in Fig. 3 includes a gear pump 40 of a well known type which is associated with the press drive to be driven thereby. Pump 40 is arranged within a casing 41 containing a fluid 42 such as oil, and said pump is driven in a direction whereby the fluid 42 enters the casing of said pump through an opening 43 and is discharged through an opening 44 into a cylinder 45 fixed to casing 41. Cylinder 45 contains a piston 46 which is biased downwardly by an adjustable spring 47 and normally covers an outlet port 48 in said cylinder 45. Switches 38 and 39 are operatively connected to said piston to be opened thereby upon upward movement thereof. As is apparent, when fluid is delivered by the pump 40 to cylinder 45 the piston 46 is held in a raised position to permit escape of the fluid through the port 48. Obviously the position of piston 46 is determined by the speed at which pump 40 is driven, and the arrangement is such that said piston effects opening of switches 38 and 39 when the speed of the press exceeds different predetermined values.

The operation of the aforedescribed controller and the circuit connections therefor will now be more fully described. With the cross head of rheostat 3 in the off position or in position 1 indicated by dotted lines in Fig. 1, the small motor switch 1 is adapted to be energized by the inch relay 12 through the medium of the stop relay 13. Such energizing circuit extends from line $l^1$ through contacts $12^b$ of the inch relay to contact 22 of rheostat 3, through bridging contact 20 to contact 24 of said rheostat to and through the operating winding $1^a$ of the small motor switch, by conductor 50 through contacts $13^c$ of the stop relay and by conductor 51 to line $l^2$. Upon response of the small motor switch 1 contacts 36 close and with the rheostat crosshead in position 1, a maintaining circuit for said switch is established extending from line $l^1$ by conductor 52 through auxiliary contacts 36, by conductor 53 to contact 21 of rheostat 3 through bridging contact 20 to contact 24 of said rheostat and through the operating winding $1^a$ of the small motor switch to line $l^2$ as already traced. Closure of switch 1 connects the small motor $M^1$ to lines $L^1$—$L^2$—$L^3$ and said motor is adapted to operate the press at a relatively low threading speed, as for example 10 to 12 R. P. M.

The above described energizing circuit for the small motor switch 1 extending through auxiliary contacts 36 is maintained upon movement of the crosshead into position 2 and with the crosshead in this position the operating winding $2^a$ of the large motor switch is connected in parallel with the operating winding $1^a$ of the small motor switch through the medium of contacts 21, 20 and 23 of the rheostat. Also switch 4 is connected in parallel with the operating winding $1^a$ of the small motor switch through the medium of contacts 21, 20 and 25 of the rheostat and switch 38.

Thus with the rheostat in position 2 the small motor $M^1$ and large motor $M^2$ are both connected to lines $L^1$—$L^2$—$L^3$ and the large motor accelerates with resistances $R^1$—$R^2$—$R^3$ included in the secondary circuit thereof and resistances $R^4$ and $R^5$ excluded from such circuit by switch 4. Upon speeding up of the press by motor $M^2$, motor $M^1$ is automatically disconnected from the press drive by mechanism of the type usually employed for this purpose in two motor printing press systems. When the speed of the large motor exceeds a given value device 41 opens switch 38 and switch 4 is thus deenergized to include resistances $R^4$ and $R^5$ in the secondary circuit of motor $M^2$. Motor $M^2$ then slows down and switch 38 recloses to again energize switch 4 for reinclusion of resistances $R^4$ and $R^5$ in the secondary circuit of motor $M^2$. The resistance in the secondary circuit of the large motor $M^2$ is thus periodically increased and decreased to provide for operation of said motor at a substantially constant speed which is determined by the speed required to effect opening of switch 38. The press speed thus obtained may be of relatively low value, as for example 75 R. P. M. to enable the operator to make the necessary margin adjustments. Also as is apparent, such relatively low press speed permits equalization of the pull on the web to prevent breakage thereof.

Upon movement of the crosshead of rheostat 3 into its third dotted line position bridging contact 20 disengages contact 24 to interrupt the aforedescribed energizing circuit for the small motor switch 1, the large motor switch being maintained energized as hereinbefore described. Also upon movement of the crosshead into this position bridging contact 20 disengages contact 25 and engages contact 26 to provide for energization of switch 4 through the medium of switch 39. Device 41 operates to open switch 39 upon a predetermined increase in the speed of the press and said switch is thus adapted to act in substantially the same manner as switch 38 to control switch 4 in a manner whereby the resistance in the secondary circuit of motor $M^2$ is periodically increased and decreased to provide for operation of said motor at a substantially constant speed. Such speed may be of a second low value, as for example 90 R. P. M.

Upon movement of the crosshead of rheostat 3 into position 4 the large motor switch 2 is maintained energized as hereinbefore described and switch 4 is maintained energized through the medium of bridging contact 20 and contact 27 of said rheostat. Motor $M^2$ then operates to accelerate the press to a higher intermediate speed, as for example 125 R. P. M., such speed being determined by the value of resistances $R^1$—$R^2$ and $R^3$.

As is apparent from Fig. 2, by continuing upward movement of the crosshead of rheostat 3, resistances $R^1$, $R^2$ and $R^3$ are excluded from the secondary circuit of motor $M^2$ to bring said motor up to a maximum speed.

The "on" relay 10 provides for operation of the pilot motor $M^3$ in a direction to effect upward movement of the crosshead of rheostat 3 while the "off" relay 11 provides for operation of said motor in a reverse direction for downward movement of said crosshead. Upon closure of either the small motor switch 1 or the large motor switch 2 "on" relay 10 provides for establishment of an energizing circuit for the pilot motor $M^3$ extending from line $l^1$ by conductor 52 through auxiliary contacts 36 by conductor 53 to rheostat contact 21 by conductor 55 through contacts $10^b$ of the "on" relay by conductor 56 through the armature A from left to right and through a resistance $r^1$ and the field winding F to line $l^2$. The "off" relay 11 provides for establishment of an energizing circuit for the pilot motor $M^3$ extending from line $l^1$ by conductor 57 through contacts $11^b$ of said relay through the armature A from right to left and thence through a resistance $r^2$ and field winding F to line $l^2$.

The controller is inoperative except upon closure of the "safe" relay 16, and as is apparent from Fig. 1 the operating winding of said relay is connected across line $l^1$—$l^2$ upon closure of the safe switch of push button station 17.

As hereinbefore set forth when the rheostat crosshead is in off position the small motor switch 1 is adapted to be energized through the medium of the "inch" relay 12 and stop relay 13. Closure of the "inch" push button establishes an energizing circuit for the "inch" relay extending from line $l^1$ through said push button by conductor 58 through the operating winding $12^a$ of said relay by conductors 59 and 60 through the safe relay to line $l^2$. The "stop" relay 13 is dependent for energization upon closure of the "reset" relay 14. Closure of the "reset" push button establishes an energizing circuit for the reset relay 14 extending from line $l^1$ through said push button to and through the operating winding $14^a$ of said relay, by conductor 60 through the "safe" relay 16 to line $l^2$. Closure of the "reset" relay 14 establishes an energizing circuit for the "stop" relay 13 extending from line $l^1$ by conductor 61 through relay 14 by conductor 62 through the operating winding $13^a$ of the stop relay by conductor 63 through a resistance $r^3$ and by conductors 64 and 51 to line $l^2$. In responding the "stop" relay 13 maintains itself by a circuit extending from line $l^1$ by conductor 65 through contacts $13^d$ of said relay and through the operating winding $13^a$ to line $l^2$ as already traced. Upon response of the "inch" relay 12 the "safe after inch" relay 15 is energized by a circuit extending from line $l^1$ by conductor 66 through contacts $12^d$ of the "inch" relay through the operating winding $15^a$ of the "safe after inch" relay, through contacts $13^e$ of the "stop" relay and by conductor 51 to line $l^2$. The "safe after inch" relay in responding maintains itself by a circuit extending from line $l^1$ by conductors 66 and 67 through contacts $15^c$ and thence through the operating winding $15^a$ to line $l^2$ as already traced.

The small motor switch 1 remains in closed position as long as the "inch" push button is held depresssed and drops out immediately upon release of such push button. Following inching operations the "stop" relay drops out, the operating winding thereof being shunted by a circuit extending from line $l^1$ by conductor 52 through auxiliary contacts 37 by conductor 68 through contacts $15^b$ of the "safe after inch" relay through normally closed contacts $12^c$ of the "inch" relay by conductors 69 and 70 through resistances $r^4$ and $r^3$ and by conductors 64 and 51 to line $l^2$. Opening of the "stop" relay 13 interrupts the aforedescribed energizing circuit for the "safe after inch" relay 15. Thus after inching operations it is necessary to effect operation of the reset relay 14 as a prerequisite to reclosure of the "stop" relay 13.

Upon depression of the "on" push button the "on" relay 10 is energized by a circuit extending from line $l^1$ through said push button to and through the operating winding $10^a$ of said relay and by conductors 71 and 60 through the "safe" relay 16 to line $l^2$. The "on" relay 10 in responding establishes an energizing circuit for the inch relay 12 extending from line $l^1$ by conductor 52 through contacts $13^b$ of the "stop" relay by conductor 72 through contacts $10^d$ of the "on" relay by conductor 58 to and through the operating winding $12^a$ of the "inch" relay by conductors 59 and 60 through "safe" relay 16 to line $l^2$. As hereinbefore set forth upon closure of the inch relay 12 and the "on" relay 10 pilot motor $M^3$ is operated in a direction to effect upward movement of the rheostat crosshead. Upon initial upward movement of the rheostat crosshead limit switch 34 closes and the "on" relay 10 is then maintained energized by a circuit extending from line $l^1$ by conductor 52 through contacts 13$^b$ of the "stop" relay through contacts 10$^c$ of the "on" relay by conductor 73 through limit switch 34 by conductor 74 through the operating winding 10$^a$ of the "on" relay and by conductors 71 and 60 through "safe" relay 16 to line $l^2$. Limit switch 34 opens to interrupt the maintaining circuit for the "on" relay 10 upon a given degree of operation of the pilot motor M$^3$. Thus provision is made for effecting upward movement of the rheostat crosshead in a step by step manner upon successive operations of the "on" push button, it being assumed that the limit switch 34 operates to effect arrest of the crosshead in the positions indicated by dotted lines in Fig. 1.

Depression of the "stop" push button provides for return of the crosshead of the rheostat to off position. Upon depression of the stop push button the operating winding 13$^a$ of the "stop" relay is shunted by a circuit extending from line $l^1$ through said "stop" push button by conductor 70 through resistances R$^4$ and R$^3$ and by conductors 64 and 51 to line $l^2$. Opening of the "stop" relay 13 establishes an energizing circuit for the "off" relay 11 extending from line $l^1$ by conductor 75 through contacts 13$^c$ of the "stop" relay through the operating winding 11$^a$ of the "off" relay by conductor 76 through limit switch 3$^a$ and by conductor 77 to line $l^2$. Upon return of the rheostat crosshead to off position limit switch 3$^a$ opens to interrupt the above described energizing circuit for the "off" relay 11.

Assuming that the rheostat crosshead is in a raised position wherein the same effects operation of the large motor M$^2$ return of said crosshead towards off position in a step by step manner is effected by successive operations of the "off" push button. Closure of the "off" push button establishes an energizing circuit for the operating winding of the "off" relay 11 extending from line $l^1$ through said push button by conductor 78 through auxiliary contacts 2$^b$ associated with the large motor switch 2 by conductor 79 to and through the operating winding 11$^a$ of the off relay and thence through the limit switch 3$a$ to line $l^2$. Upon initial downward movement of the rheostat crosshead switch 35 closes to establish a maintaining circuit for the operating winding of the "off" relay extending from line $l^1$ by conductor 52 through contacts 11$^c$ of the "off" relay to and through switch 35 by conductors 80 and 79 to and through the operating winding 11$^a$ of the "off" relay and thence through limit switch 3$^a$ to line $l^2$ as already traced. Limit switch 35 opens to interrupt the aforedescribed maintaining circuit for the "off" relay 11 upon a given degree of operation of the pilot motor M$^3$.

What I claim as new and desire to secure by Letters Patent is:

1. The combination with a drive including a main motor and an auxiliary motor, of control means for said motors operable to first start said auxiliary motor and to thereafter start said main motor, said control means providing for operation of said main motor at a relatively high speed, and means associated with said control means and including a device responsive to given speed variations of said motor for restricting the latter to operation at a predetermined substantially constant low speed.

2. The combination with a drive including a main and an auxiliary motor, of control means for said motors operable to first start said auxiliary motor and to thereafter start said main motor for operation at a relatively high speed, and means controlled by said former means and including a device responsive to variations in the speed of said main motor for restricting the latter to any one of a plurality of low speeds selectively according to the setting of a part of said first mentioned control means.

3. The combination with a drive including a main motor and an auxiliary motor, of a control device for said motors movable into a given position to start said auxiliary motor and into another position to effect operation of said main motor at a relatively high speed and means responsive to given speed variations of said main motor and operable in the last mentioned position of said control device to restrict said main motor to operation at a predetermined substantially constant low speed.

4. The combination with a drive, including a main induction motor and an auxiliary induction motor, of a common control device for said motors adapted in a given position to start said auxiliary motor and in another position to start said main motor, a plurality of resistances to be included in the secondary circuit of said main motor, certain of said resistances being associated with said control device and providing for operation of said main motor at a relatively high speed upon starting thereof by said device and means responsive to the speed of said main motor and adapted to act in a given position of said device to control the other of said resistances to restrict said main motor to a predetermined substantially constant low speed.

5. The combination with a drive including a main motor and an auxiliary motor, of a control device for said motors movable into a given position to start said auxiliary motor and into a plurality of other positions to effect operation of said main motor at relatively high speeds, and means responsive to given speed variations of said main motor and adapted to act in certain of the latter positions of said control device to restrict said main motor to different predetermined substantially constant low speeds selectively.

6. The combination with a drive including a main induction motor and an auxiliary induction motor, of a control device for said motors movable in a step by step manner into a given position to start said auxiliary motor and into other positions to effect operation of said main motor, a plurality of resistances, certain to be included in the secondary circuit of said main motor in the latter positions of said device to provide for operation of said main motor at a relatively high speed, and means adapted to act in the latter positions of said device to periodically include and exclude the other of said resistances in accordance with given speed variations of said main motor to selectively provide for operation of said main motor at different predetermined substantially constant low speeds.

In witness whereof, I have hereunto subscribed my name.

ERIC H. LAABS.